March 19, 1935.  J. A. PROCTOR  1,995,156
ELECTRICAL APPARATUS
Original Filed Feb. 28, 1923
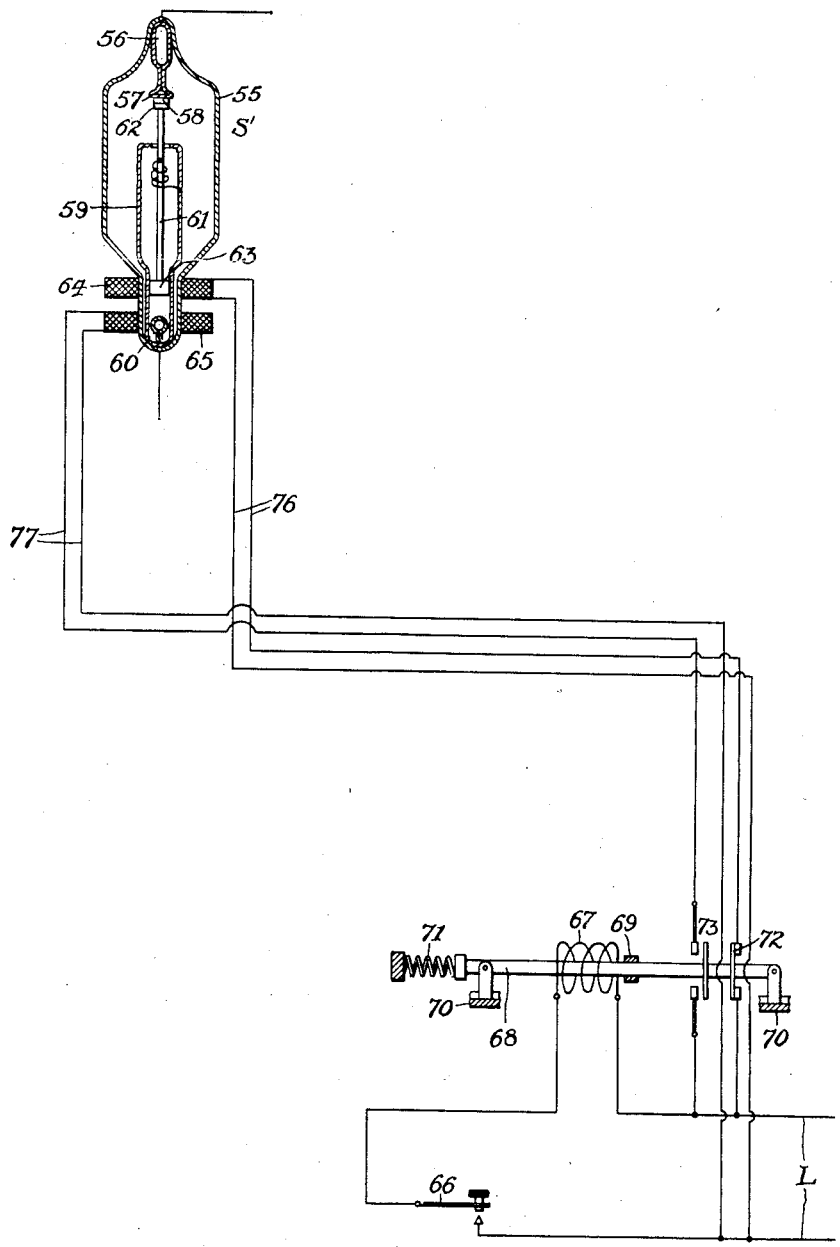
INVENTOR
John A. Proctor
BY
ATTORNEY

Patented Mar. 19, 1935

1,995,156

UNITED STATES PATENT OFFICE 1,995,156

ELECTRICAL APPARATUS

John Albert Proctor, Lexington, Mass., assignor, by mesne assignments, to General Electric Company, a corporation of New York Original application February 28, 1923, Serial No. 621,728, now Patent No. 1,836,725, dated December 15, 1931, which in turn is a division of Serial No. 475,144, June 4, 1921, now Patent No. 1,510,341, dated September 30, 1924. Divided and this application March 7, 1928, Serial No. 259,880

3 Claims. (Cl. 200—144)

My invention relates to electrical switching apparatus for use in high potential work, such as in radio transmitters and receivers and in power factor work where the switching apparatus is used to connect condensers in and disconnect them from high voltage power lines to provide the best power factor for varying conditions of load.

An object of the present invention is to provide an improved vacuum switch construction for replacing the high voltage oil and other standard forms of switches in service of the above type.

In particular, the object of the invention is to provide a high potential, high vacuum alternating current switch which will be comparatively cheap and economical to build and which is efficient and durable and in which there will be very little loss or sparking.

This application is a division of my previous application, Serial No. 621,728, filed February 28, 1923, now Patent 1,836,725 issued Dec. 15, 1931 which, in turn, is a division of my prior Patent No. 1,510,341, dated September 30, 1924, which patent is a continuation in part of my application, Serial No. 441,628, filed February 1, 1921, and issued as Patent 1,633,285, June 21, 1927.

In power factor work, a reliable high voltage disconnecting switch has not been available for use in connection with static condenser installations.

The power factor of a high voltage system varies with the load on the system. It is, therefore, of great importance to be able to control the amount of condenser current placed across these lines in such a manner as to provide the best power factor for conditions of load on the system. In a power factor static condenser installation across a fairly low voltage line, the amount of correction may be varied by switching condensers on and off the line, using oil or other switches of standard design. However, if condensers are placed directly in the high potential line, the standard switching means now on the market is not suitable for use in continuously making and breaking circuits connected to them, due to the destructive arcing accompanying their operation. Oil switches of proportions ample to take care of the disconnection and reconnection of apparatus on high potential lines are too expensive to warrant their use for this work. Disconnecting switches, therefore, form an important element of the static condenser power factor system. Inasmuch as the hourly variation of power factor on a high voltage line is large, and therefore, if economic correction is provided for the maximum lagging conditions, means must be provided for reducing this correction as the load is removed.

An important thing in the use of condensers for power factor work hinges about the ability to successfully and cheaply disconnect at will banks of high voltage condensers. Assume, for example, a high voltage line without load. The line would simply be carrying charging current or have a very low leading power factor. As the substations take off load, the power factor would increase and still be leading. Since sub-station loads are usually at a lagging power factor, the capacity reactance of the line is ultimately neutralized by the inductive reactance of the load. A point is usually reached within a range of 10% to 75% of the full output of the system when the power factor is approximately unity. As more load with lagging characteristic is added to the line, the whole system becomes lagging and the power factor drops. The power factor may be restored by adding a condenser at the consuming end. It will be appreciated that if this is done and the consumers cut off their load and leave the condenser connected to the line for light loads on the line, the power factor will be low and leading. The main objection to this is not that there will be high losses on low loads, but is primarily one of poor voltage regulation. If the condensers are cut out of circuit in steps as the load is varied, the power factor can be maintained at a high value over a considerable variation in load. The importance of correction control increases with the length and voltage of the line.

Likewise no suitable switch has been herebefore devised which is capable of withstanding, when open, the normal working voltage of say 50,000 volts, and at the same time to have the contacts close enough together so that they will work sufficiently sensitive to open and close quickly.

In the present invention it is my plan to provide vacuous switches for replacing the switches now in use in high potential circuits of the above character. In carrying out my improvement I provide relatively movable contacts which operate in a vacuum, the contacts being enclosed in a bulb from which air has been exhausted.

In the accompanying drawing, the single figure represents a form of switch embodying my present invention.

Referring to the drawing, the vacuum switch comprises a casing 55 of insulating material having within the same at one end a metal support 56, terminating in a spring or cushion 57 having a contact 58 thereon. Mounted in the opposite end of the casing 55 is a metal support or guide 59 having at its lower end a spring buffer or cushion 60. Slidably mounted within the guide 59 and between the cushions 57 and 60 is a rod 61 having at its inner end a contact 62 cooperating with contact 58. At the opposite end of rod 61 is a soft iron armature 63 whereby the rod 61 and its contact 62 may be actuated in the manner hereinafter described. The parts within the casing 55 may be assembled, treated and evacuated in the manner hereinafter described. These contacts 58 and 62 which may be of silver or similar low melting good conducting metal, operate in a vacuum whereby their separation and contact may be rapid and quick while maintaining high insulation resistance between them when opened by reason of the high dielectric properties of the vacuum. Surrounding the end of the tube 55, having movable armature 63, are a pair of solenoids or electromagnets 64 and 65, adapted when energized respectively to close the contacts 58 and 62 and separate them.

In order to position or place the metal parts of the present invention within the casing, during construction, one or both ends of the casing is left open so that the parts may be inserted. When the parts are in position, the end or ends are then sealed up and the leads through the ends sealed in. A glass tube is left extending into the casing and at some accessible point, through which tube the high degree of exhaustion can be obtained. After exhaustion the tube through which the exhaustion has taken place may be melted from the casing and sealed up.

The order of vacuum or exhaustion which exists in a high potential vacuous switch of the above-described types should be extremely high, such that no appreciable gas ionization takes place to cause losses while the apparatus is in operation, which condition is obtained, for example, by a pressure of the order of a millionth of a millimeter of mercury. Such exhaustion may be obtained by any well known means, such as a Gaede or molecular pump or Langmuir's condensation pump.

All materials inside the casing of such vacuous apparatus are to be suitably treated to remove gases (occluded or otherwise) according to any of the well known processes in use for the production of high vacuum apparatus. Such treatment may consist, for example, in initially, before assembling in the casing, treating these materials to remove gas preliminarily, as by heat of the order of the melting point of the materials or by heat of a lower order for a longer period. One method of removing such occluded gases is to place the metal parts in an oven and heat them to a high temperature, of the order of 500° to 1100° C. for a sufficient time to remove the gases. In addition, it is advisable after assembling in the casing, which may be of high melting point glass, to subject the contained materials and casing to further treatment to remove any residual or occluded gases, while evacuation is taking place. This final treatment may consist of heating in an oven at the highest temperature the glass will stand—say in the neighborhood of 500° C., evacuation taking place while being heated in the oven. The casing or bulb is then sealed off.

Another final treatment may be the well-known method of removing gases from metals by inserting the metallic portions of the casing in a high frequency magnetic alternating field of a suitable intensity during exhaustion. In this final treatment, the entire device, while undergoing exhaustion, may be placed within the field of a coil carrying high-frequency current. This heats the metal parts inside the casing, thereby driving off and removing gases before the device is completely exhausted, and then sealed off.

The materials used inside the vacuum apparatus herein described should be of such a nature that the gases may easily be removed by the above-described processes. Therefore, nickel, tungsten, molybdenum, pure iron, preferably coated with cobalt, or rolled steel should be used wherever possible in constructing such parts.

The leading in conductors may be of platinum if so desired, especially when the casing is of glass, on account of the similar co-efficients of expansion of glass and platinum, and, in any instance, any well-known seal, such as used with high vacuum devices such as X-ray tubes, thermionic devices, and the like, may be used for bringing the conductors out and maintaining the high vacuum necessary in the present invention.

Vacuum switches of the above type are of general application and are especially adapted for use in power factor work.

In the illustration the switch S' is so arranged that it may be remotely controlled. For this purpose, I have illustrated the control key 66 in series with the line L, which, when it is depressed, energizes a solenoid 67, which in turn actuates a multiple switching device or rod 68 by reason of its attraction for a soft metal core 69 secured to the rod 68. The rod 68 is slidably mounted in suitable guides 70, and is constrained to move in one direction by means of a spring 71, the solenoid 67 actuating rod 68 in the opposite direction upon the depression of the key 66, the spring actuating the rod upon the release of the key 66. The rod 68 controls the switches 72, 73. When the key 66 is depressed to close the circuit L, the switch 72 is opened, and then the switch 73 is closed. In the position illustrated in the drawing, the switch 72 is closed, the other switch being open, thereby energizing the solenoid 64 which is connected to the line by leads 76 through switch 72. Upon the depression of key 66, switch 72 opens, de-energizing the solenoid 64, and then yielding switch 73 closes, energizing the solenoid 65 connected to the line through conductors 77 to rapidly open the contacts 58 and 62 by the attraction of the solenoid 65 for the armature 63.

The contacts 58 and 62, although close together, when open are sufficiently insulated by the vacuum dielectric to prevent sparking or brushing during operation. On the other hand, these contacts 58 and 62 are closed whenever the key 66 is released. The form of switch disclosed herein is characterized by the rapidity of opening in a vacuum and is especially advantageous for use in handling high potential. As pointed out above the form of vacuum switch disclosed herein is of general application and is especially adapted for use in power factor work to connect banks of condensers to and disconnect them from high voltage power transmission lines to provide the best power factor for varying conditions of load. In service of this character, the form of vacuum switch disclosed herein has marked advantage over oil or other switches of standard design which are not suitable for use in continuously making and breaking the high potential alternating current power circuits due to their large size and cost as well as to the destructive arcing accompanying their operation.

It has been found since the filing of my original application on February 1, 1921, that the form of vacuum switch disclosed herein with contacts of silver or similar good conducting material treated to remove residual and occluded gases and provided with a non-ionizable vacuum operates to interrupt a high potential alternating current power circuit of the character described above, with a form of arc which is in the nature of a relatively cool cathode electron discharge, which is not nearly as destructive as the arcing which occurs in oil switches or other standard high potential switching means in similar service. As at present understood, such relatively cool cathode form of electron discharge or non-destructive arc will result only when, as disclosed herein, no appreciable gas ionization occurs during the operation of the vacuum switch and only when, as disclosed herein, the contacts are of a metal such as silver or similar good conducting metal, the criterion apparently being that the metal shall vaporize before reaching the temperature required for thermionic emission of electrons.

In this connection, it may be helpful to consider just what phenomena will produce the non-destructive arc when a high voltage alternating current circuit is interrupted as for example when the bank of power factor condensers is disconnected from the transmission line by the separation of silver or similar metal contacts in a vacuum switch treated and exhausted to remove residual and occluded gases and provided with a non-ionizable vacuum, as disclosed herein. Upon the separation of the contacts of silver or similar metal, the concentration of all the current at the last minute point of contact results in the melting and vaporization of this portion of the contacts without, however, the possibility of raising the contacts to the temperature at which thermionic emission occurs. As the contacts just begin to separate but are still infinitesimally close together, the potential drop therebetween necessarily is of the order of millions of volts per centimeter. Such a voltage gradient will readily draw electrons directly from the negative contact even though it is below the temperature at which thermionic electron emission occurs. The resulting collision of these electrons with the metal vapor in the space between the contacts will result in ionization of the metal vapor with the production of additional electrons as well as positive ions. The positive ions travel relatively slowly toward the negative contact and thereby serve to maintain the high potential gradient at the negative contact surface even though the contacts have become separated a considerable distance. The bombardment of the negative contact by the positive ions also maintains the surface thereof heated sufficiently to continue the supply of metal vapor. Thus, this cool cathode electron discharge or non-destructive arc, when once initiated, continues as long as a moderate voltage between the contacts is maintained. Consequently, with the contacts of the vacuum switch connected in a high voltage alternating current circuit, the cool cathode electron discharge through the ionized metal vapor which produces the non-destructive arc continues until the alternating current wave approximates the zero value of the current wave. Thereupon the positive ions immediately disappear and the metal vapor rapidly diffuses and condenses so that the conditions required for the formation of an electron discharge or arc during the next half cycle are no longer present. Consequently this non-destructive arc may be termed a fractional cycle arc as the cool cathode discharge can continue only until the next succeeding zero unit point of the alternating current wave is reached.

With the cool cathode electron discharge or non-destructive arc just described, only a relatively small potential of the order of 20 to 60 volts exists across the contacts of the vacuum switch even in a high potential circuit. As a result only a relatively small amount of energy is released within the vacuum switch, and the vaporization of the contact metal is so inappreciable as to be practically negligible. However with vacuum switch contacts of silver or similar good conducting metal, the impact of positive ions thereupon in the manner just described sputters or vaporizes a minute portion of the metal which upon condensation at or before the zero point of the current wave is reached, operates as a "getter" to maintain and even improve the high degree of vacuum. This "getter" characteristic of sputtered metal electrodes formed of silver or similar metal is well known in the art and is disclosed for example in the Coolidge Patent No. 1,289,672, of December 31, 1918.

Thus the cool cathode form of arcing which occurs in the operation of the vacuum switch disclosed herein in interrupting high potential alternating currents is not of a destructive nature and the action of the vacuum is not in any way comparable to the arc extinguishing action of oil or other mediums such as used in oil or other switches of standard design. Moreover the present invention renders it possible to provide a simple and inexpensive high voltage disconnecting switch which will stand up under the severe duty of frequent disconnection and connection of the condensers to the high potential transmission lines in the power factor work described above, and in other alternating current circuit interrupting applications of similar character.

In order to localize the electric fields both inside and outside of the casing and to maintain such fields parallel with the casing at all points to prevent the cutting of the casing by the lines of force which would otherwise heat the casing, I may utilize the construction shown and described in Fig. 1 of my Patent No. 1,510,341, of which this application is a division. Under certain operating conditions the difference of potential between the two ends of the casing will be of the order of 50,000 volts and the protection afforded by such construction may be desirable.

The casings or bulbs herein referred to and claimed may comprise insulating material wholly or in part in order properly to insulate the leads and should also comprise material such that a vacuum may be maintained in a casing composed of it.

The construction of vacuum switches as above described provide compact, cheap, efficient means for controlling the high potentials in circuits where they are used. These vacuum switches are highly sensitive and with very slight separation of contacts maintain the circuits electrically open, notwithstanding the high potentials existing in their neighborhood.

It is to be understood that the invention is not limited to the embodiments and features specifically shown and described herein, but that such embodiments and features are subject to changes and modifications without any departure from the spirit of the invention.

What I claim as new and desire to secure by Letters Patent of the United States, is:

1. In a switch, an air-tight frangible casing from which air has been exhausted, a contact mounted within said casing at one end, a guide mounted within the casing at the opposite end, a contact slidably supported by said guide and cooperating with the first contact, said contacts being operable in a vacuum, means associated with said guide for cushioning said slidably supported contact, means for actuating the slidably supported contact into and out of engagement with the first contact, and leads from said contacts through said casing.

2. In a switch, a frangible casing of insulating material from which air has been exhausted, relatively movable contacts within said casing operable in the vacuum, cushioning means for supporting one of said contacts to take up the closing impacts of said contacts, and a second cushioning means disposed in spaced relation with the other of said contacts for taking up the opening impacts thereof, leads from said contacts extending through the casing, and means for moving said contacts into and out of engagement.

3. In a vacuum high tension switch, the combination with the evacuated frangible casing enclosing the relatively movable contacts of a metal member mounted inside the casing, a cushioning means supported by said metal member and carrying one of the switch contacts, and means for moving said contacts into and out of engagement.

JOHN A. PROCTOR.